April 7, 1953 G. W. HIGGS 2,633,842
INFANT INCUBATOR
Filed March 20, 1951 3 Sheets-Sheet 1
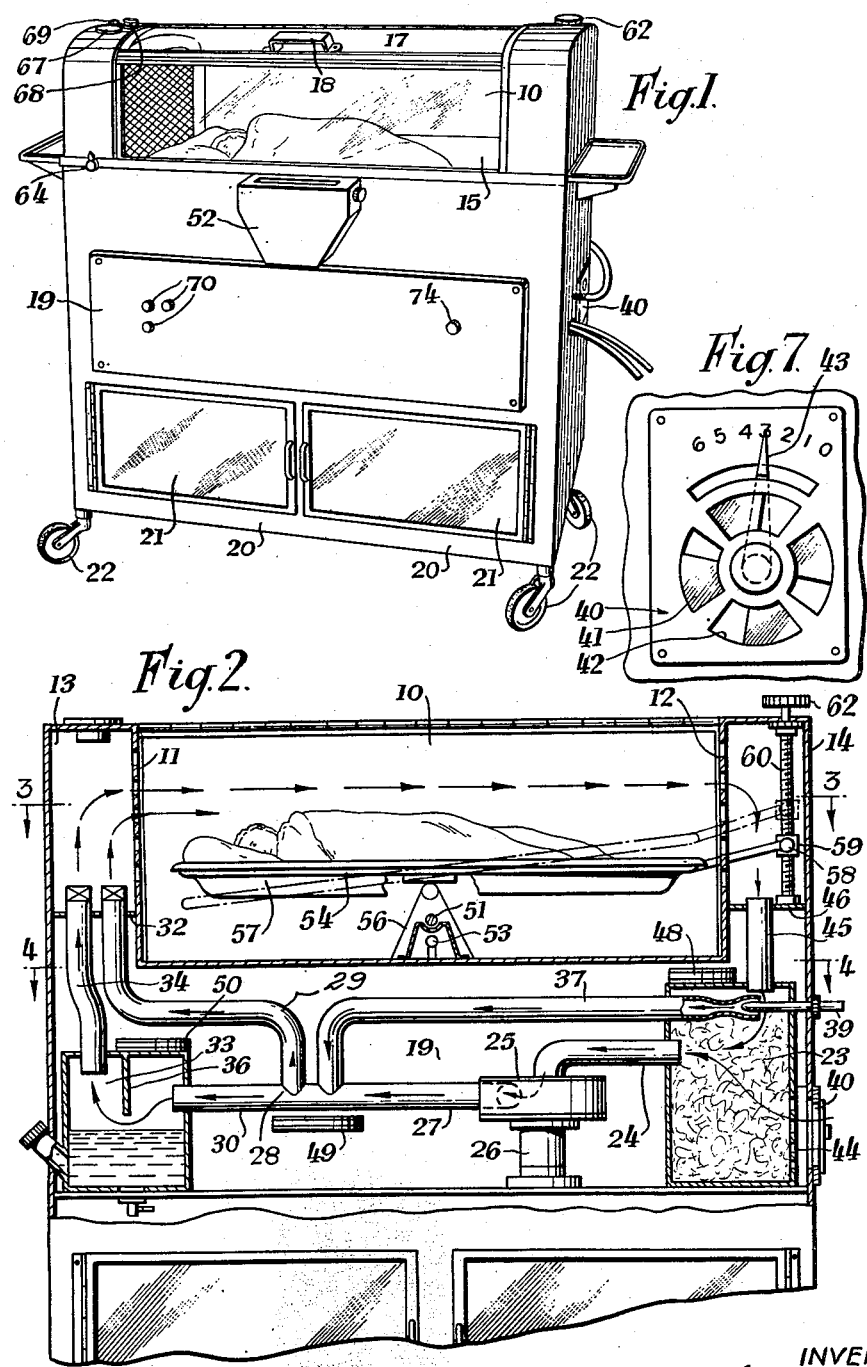
INVENTOR
George William Higgs
BY Rines and Rines
ATTORNEY.

April 7, 1953   G. W. HIGGS   2,633,842
INFANT INCUBATOR
Filed March 20, 1951   3 Sheets-Sheet 2
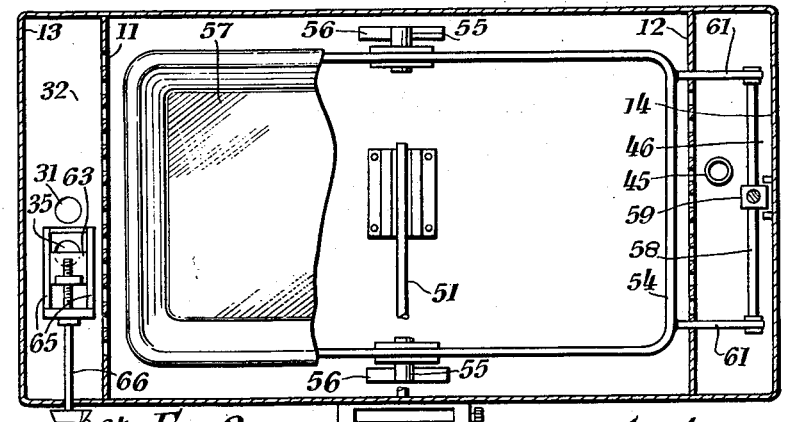
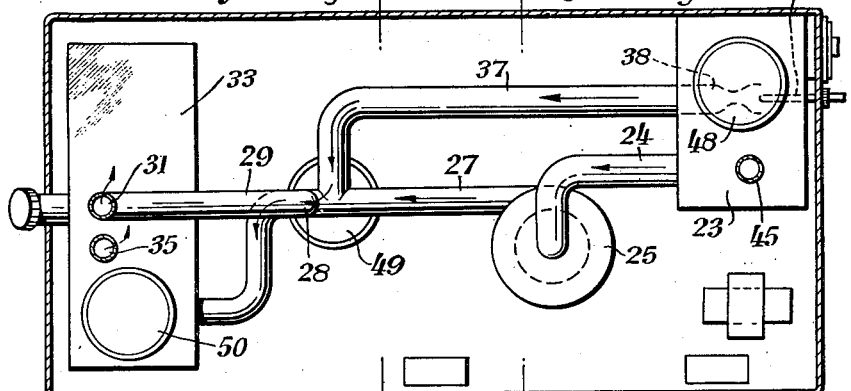
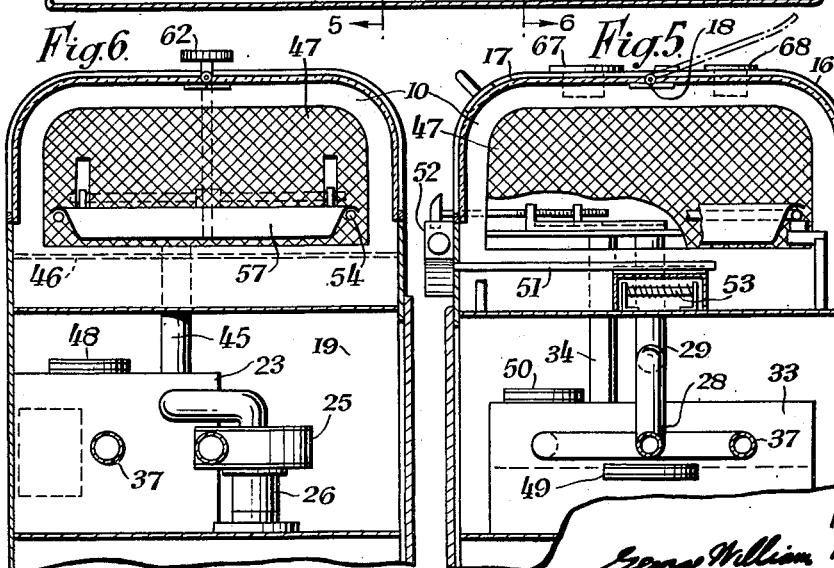
INVENTOR
George William Higgs
BY Rives and Rives
ATTORNEY.

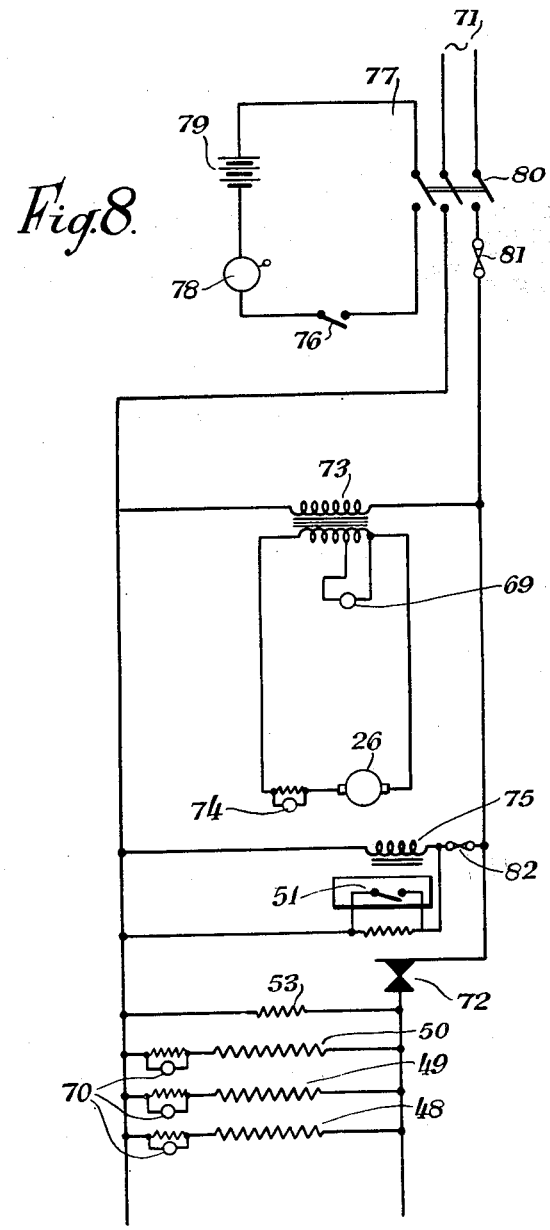

UNITED STATES PATENT OFFICE 2,633,842

INFANT INCUBATOR

George William Higgs, London, England

Application March 20, 1951, Serial No. 216,477
In Great Britain March 30, 1950

7 Claims. (Cl. 128—1)

This invention relates to infant incubators for treating newly born infants, particularly premature infants, by maintaining them in an atmosphere which is closely controlled as to temperature and humidity and can, if required, be given a high oxygen content.

The object of the invention is to provide a unit, preferably portable, which includes the treatment chamber itself, all the necessary apparatus for circulating, heating and humidifying the air and for adding oxygen thereto in the desired proportion, and control means for the said apparatus, the unit requiring only to be connected to a source of electric current supply and a supply of oxygen to be fully operative.

An infant incubator according to the invention comprises a treatment chamber formed as the upper part of the unit, the lower part of the unit containing, in a space which is completely isolated from the treatment chamber, apparatus for circulating, heating and humidifying air and for adding controlled quantities of oxygen thereto, the air circulating apparatus supplying air to one end of the treatment chamber and withdrawing it from the other.

The invention is hereinafter described with reference to the accompanying drawings, in which:

Figure 1 is a perspective view of one form of infant incubator according to the invention;

Figure 2 is a longitudinal section of the unit shown in Figure 1, some of the parts being displaced from their normal relative positions for clarity;

Figure 3 is a sectional plan taken on the line 3—3 of Figure 2;

Figure 4 is a sectional plan taken on the line 4—4 of Figure 2;

Figures 5 and 6 are sectional elevations taken respectively on the lines 5—5 and 6—6 of Figure 4;

Figure 7 is a detail shown in elevation; and

Figure 8 is a diagram showing the electrical circuit of the unit.

Referring to the drawings, the incubator comprises a metal cabinet the upper part of which forms an incubation chamber 10, the ends of which are defined by inner end walls 11 and 12 spaced from the outer end walls 13 and 14 of the cabinet. The incubation chamber 10 is closed by a transparent cover including a fixed front portion 15, a fixed portion 16 extending over the back and half the top of the chamber, and a portion 17 hinged at 18 to the portion 16, to provide access to the chamber. The edges of the portion 17 rest on strips of soft material such as rubber or felt to reduce leakage of air.

A compartment 19 below the incubation chamber contains the air circulating and treating apparatus, and below the compartment 19 are lockers 20, 20 closed by hinged doors 21. The unit is mounted on castors 22 to provide mobility. The apparatus in the compartment 19 includes an air drying tank 23 at one end of the compartment, a conduit 24 leading from the tank 23 to the inlet of a fan 25 driven by an electric motor 26, a conduit 27 leading from the outlet of the fan 25 to a junction at 28, and branch conduits 29 and 30 leading from the junction. The conduit 29 leads directly to a port 31 in a horizontal partition 32 between the inner and outer end walls 11 and 13, and the conduit 30 leads into a water tank 33 from which another conduit 34 leads to a second port 35 in the partition 32. A downwardly-extending baffle 36, Figure 2, is provided in the tank 33. A conduit 37 leads from the tank 23 into the conduit 27 upstream of the junction 28, this conduit 37 being connected to a Venturi tube 38 (Figures 2 and 4) in the tank 23, into the mouth of which projects a tube 39 projecting to the exterior of the cabinet for connection to an oxygen cylinder. A controllable air inlet 40 is provided in the tank 23, comprising an apertured disc 41 (Figure 7) rotatably mounted to co-operate with fixed apertures 42 in the cabinet wall and associated with an indicator pointer 43, a filter pad 44 (Figure 2) being located on the inner side of the inlet 40. A conduit 45 leads from a horizontal partition 46 between the end walls 12 and 14 into the top of the tank 23. The inner end walls 11 and 12 of the incubation chamber are provided with open mesh screens 47.

Electric heaters 48, 49 and 50 are provided on the tank 23, the junction 28 and the tank 33 respectively.

A thermostat 51 is provided in the incubation chamber 10, and is provided with control means at 52 for setting the temperature in the incubation chamber. An auxiliary electric heater 53 of small capacity is provided close to the thermostat.

A flat tubular metal frame 54 is mounted in the incubation chamber on a transverse pivot at the longitudinal centre of the chamber, the frame 54 having welded to it two stub shafts 55, 55 which rest in grooves in the tops of pedestals 56, 56. The frame supports a tray 57 in which the patient to be treated is laid. The inclination of the frame is adjustable by means of a yoke 58 carried by a nut 59 mounted on a screw-threaded shaft 60 mounted vertically in bearings between the end walls 12 and 14, the yoke being connected to the frame 54 by links 61, 61 passing through slots in the inner end wall 12. The shaft 60 is operated by a knob 62.

The port 35 in the partition 32 is controlled by a slide 63 actuated by a knob 64, the slide being mounted in guides 65 on the partition and carrying a nut engaging a screw-thread on a rod 66 carrying the knob 64.

A humidity meter 67 and a thermometer 68 are provided on the top of the casing, and also a warning light 69 which remains alight at all times when the current is switched on. Additional warning lights 70 are provided which indicate when the various heaters are working, and a further warning light 80 which remains alight so long as the motor is running. A bell or other audible warning device is provided, operated by an independent electricity supply, this audible warning being brought into operation if the main electricity supply fails.

Figure 8 shows the electrical circuit of the unit. Connections to alternating current supply mains of suitable voltage are made at 71, the heaters 48, 49, 50 and 53 being connected directly across the mains and the heaters 48, 49 and 50 having in series with them their respective indicator lights 70, each in parallel with a resistance. The thermostat 51 operates a hot wire vacuum switch 72 the contacts of which are arranged in one of the supply lines to the heaters. The thermostat controls contacts in parallel with the heating wire of the hot wire vacuum switch, opening the contacts to cause heating of the wire when the set temperature is reached. The primary of a transformer 73 is also connected across the mains, the transformer supplying current to the motor 26 and its indicator light 74. A relay coil 75, also connected across the mains, controls contacts 76 in the circuit 77 including the alarm bell 78 and a dry battery 79. A triple pole main switch 80 controls both the connections to the supply mains and the circuit 77. A main fuse 81 is provided, and also a fuse 82 which, in the event of the ambient temperature rising above a predetermined value, breaks the circuit through the heating wire of the hot wire vacuum switch and the relay coil 75, thus opening the heater circuit and causing the alarm bell to ring. This arrangement provides for preventing excessive temperatures from being reached if the thermostat fails. The warning light 69 is connected across a part of the secondary winding of the transformer 73.

The unit operates in the following manner. Air is circulated by the fan 25 through the conduit 27, branch conduits 29, 30, the incubation chamber 10, conduit 45, tank 23 and conduit 24, a proportion of fresh air determined by the setting of the inlet 40 being constantly drawn in through the inlet 40, to replace leakage from the incubation chamber. The air is dried and warmed in the tank 23 by the heater 48, and is further warmed by the heater 49 at the junction 28. The air which passes through the conduit 30 also passes through the tank 33, which, being heated by the heater 50, maintains the air above the water therein constantly saturated with water vapour, and thus the air supplied to the incubation chamber through the conduit 34 is saturated. The slide 63 controls the opening of the port 35, and thus controls the proportion of saturated air supplied to the incubation chamber, to control the humidity.

If oxygen is required, an oxygen cylinder is connected to the tube 39, the oxygen being fed through the venturi 38 and conduit 37, so that it draws air from the tank 23 as it flows through the venturi. If the fan 25 should fail whilst oxygen is being supplied, the flow of oxygen keeps up the air circulation.

The heaters are controlled by the thermostat 51 to maintain a constant predetermined temperature in the incubation chamber. The auxiliary heater 53 heats the thermostat 51 directly, and thus brings it to the predetermined temperature before the main the heaters have heated the air sufficiently to bring the incubation chamber 10 to that temperature, but as the auxiliary heater 53 has a much smaller heat storage capacity than the main heaters, it cools down and allows the thermostat to cut in before the main heaters have cooled down to any great extent.

The required temperature is thus built up gradually, and the temperature does not rise substantially above the set limit due to storage of heat by the main heaters.

If the fan 25 ceases working, due to stopping of the motor 26, the warning light 80 goes out. The warning lights 70 light up when the heaters are on, and go out when the heaters are off. If the main currents supply fails, the circuit 77 is closed and the alarm bell rings, whilst at the same time the light 69 goes out.

The position of the patient is determined by turning the knob 62 to rock the frame 54 and tray 57 about the pivot shafts 55.

I claim:

1. An air circulating and humidifying system in an infant incubator comprising an air drying chamber, means for admitting atmospheric air to said drying chamber, a fan drawing air from said drying chamber, two conduits both receiving air delivered by said fan, a humidifying chamber interposed in one of said conduits, an incubation chamber into which both of said conduits lead, valve means controlling the flow of air through at least one of said conduits, and a return conduit leading from said incubation chamber to said air drying chamber.

2. An air circulating system in an infant incubator comprising an air drying chamber, means for admitting atmospheric air to said drying chamber, a fan drawing air from said drying chamber, an incubation chamber, a main air conduit leading from said fan to said incubation chamber, a Venturi tube having its mouth open to said air drying chamber, a fan by-pass conduit leading from said Venturi tube and connected to the main air conduit on the downstream side of the fan, an oxygen supply tube projecting into the throat of said Venturi tube, and a return conduit leading from said incubation chamber to said air drying chamber.

3. An air circulating and humidifying system in an infant incubator comprising an air drying chamber, means for admitting atmospheric air to said drying chamber, a fan drawing air from said drying chamber, a humidifying chamber, a first air conduit leading from said fan to said humidifying chamber, an incubation chamber, a second air conduit leading from said humidifying chamber to said incubation chamber, a third air conduit branching from said first air conduit and leading directly to said incubation chamber, valve means controlling the relative flow of air in said second and third conduits, a Venturi tube having its mouth open to said air drying chamber, a fan by-pass conduit leading from said Venturi tube and connected to the first air conduit between the fan and the junction therewith of the third air conduit, an oxygen supply tube projecting axially into the throat of said Venturi tube so that oxygen entering said Venturi tube induces a flow of air through said Venturi tube, and a return conduit leading from said incubation chamber to said air drying chamber.

4. An air circulating and humidifying system in an infant incubator comprising an air drying chamber, means for admitting atmospheric air to said drying chamber, a fan drawing air from said drying chamber, a humidifying chamber, a first air conduit leading from said fan to said humidifying chamber, an incubation chamber, a second air conduit leading from said humidifying chamber to said incubation chamber, a third air conduit branching from said first air conduit and leading directly to said incubation chamber, valve means controlling the flow of air in said second air conduit, a return conduit leading from said incubation chamber to said air drying chamber, first electric heating means for heating said air drying chamber, second electric heating means for heating said first air conduit, third electric heating means for heating said humidifying chamber, and thermostatic means actuated by the temperature in the incubation chamber controlling the supply of electric current to all three heating means.

5. An infant incubator comprising a cabinet, an incubation chamber in the upper part of said cabinet, outer end walls closing the ends of said cabinet, inner end walls closing the ends of said incubation chamber and spaced from said outer end walls, horizontal partitions between said inner and outer end walls to enclose spaces therebetween, open mesh screens in said inner end walls, an air drying chamber, a fan drawing air from said air drying chamber, a humidifying chamber, a first air conduit connecting said fan to said humidifying chamber, a second air conduit connecting said humidifying chamber to the space between one pair of end walls, a third air conduit branching from said first air conduit and leading directly to said space, valve means controlling the flow of air in said second air conduit, a return air conduit leading from the space between the other pair of end walls to the air drying chamber, and means for admitting atmospheric air to said drying chamber.

6. An air circulating and humidifying system for an infant incubator according to claim 1, including regulating means for regulating the atmospheric air admitting means.

7. An infant incubator comprising a cabinet, an incubation chamber in the upper part of said cabinet, outer end walls closing the ends of said cabinet, inner end walls closing the ends of said incubation chamber, horizontal partitions between said inner and outer end walls enclosing spaces therebetween, open mesh screens in said inner end walls, air circulating means drawing air from one of said spaces and returning it to the other, trunnion supports located in said incubation chamber one on each side thereof, a frame, trunnions on said frame rockably engaging said trunnion supports, a vertical screw mounted in one of said spaces, a nut on said screw, means for holding said nut against rotation, links connecting said nut to said frame, and an infant-supporting tray mounted on said frame, said infant supporting tray being angularly adjustable about said trunnions with said frame by rotation of said screw.

GEORGE WILLIAM HIGGS.

REFERENCES CITED

The following references are of record in the file of this patent:

UNITED STATES PATENTS

| Number | Name | Date |
| --- | --- | --- |
| 2,243,999 | Chapple | June 3, 1941 |
| 2,246,820 | Taylor | June 24, 1941 |